Feb. 25, 1941.    D. A. PRICE ET AL    2,232,967
THRUST BEARING
Filed Dec. 24, 1938

Inventors:
Donald A. Price,
George C. Janser,
Perry I. Nagle,
BY Wilkinson, Huxley, Byron & Knight
ATTORNEYS.

Patented Feb. 25, 1941

2,232,967

UNITED STATES PATENT OFFICE 2,232,967

THRUST BEARING

Donald A. Price, George C. Janser, and Perry I. Nagle, Chicago Heights, Ill., assignors to The American Brake Shoe and Foundry Company, New York, N. Y., a corporation of Delaware Application December 24, 1938, Serial No. 247,596

6 Claims. (Cl. 308—233)

The present invention relates to anti-friction bearings, and more in particular to a two-directional thrust bearing.

Among the objects of the present invention is to provide a novel thrust type bearing adapted to be applied to a shaft with ease and facility and to effectively transmit thrust forces without undue wear from said shaft to thrust receiving abutments irrespective of the misalignment of said shaft.

The present invention has as an object the idea of incorporating in a thrust type of bearing a housing having suitable means providing a chamber for retaining lubricant for the anti-friction bearing forming a part thereof.

Still a further object of the present invention is to provide a thrust type bearing with a housing which serves in the dual capacity of a lubricant housing and an element for the transmittal of thrust when mounted in position on a shaft. More particularly, the housing is so constructed and arranged with respect to thrust receiving members or abutments that said thrust is equally distributed among all of the anti-friction members of the bearing under all normal variations in the alignment of the shaft encountered in the structure in which said thrust bearing assembly is incorporated. In the particular embodiment selected to illustrate the present invention the equal distribution of thrust loads is effected through complementary cooperating curved surfaces on the housing and the thrust receiving abutments, such surfaces providing for movement of the housing in accordance with the misalignment of the shaft.

Still an additional object of the present invention is to incorporate swingably and movably mounted thrust receiving abutments for the thrust bearing assembly as above described, which mounting for said thrust receiving abutments provides for adjustment of the housing upon misalignment of the shaft and eliminates any possibility of unequal distribution of thrust load to the anti-friction members of the thrust bearing assembly, which greatly increases the life of the bearing because of decreased friction between the movable elements thereof.

Still another object within the purview of the present invention is to provide a novel type of thrust bearing assembly readily assembled in position on a shaft and incorporating elements which may be easily and accurately adjusted to control end play in the shaft within extremely close limits, while allowing the shaft to rotate with a minimum of friction, which construction greatly increases the life of the thrust bearing assembly yet provides for proper operation thereof under all conditions.

The invention still further contemplates the idea of enclosing the thrust bearing within a multi-part housing so designed as to provide a lubricant retaining chamber assuring proper lubrication for the thrust bearing and to properly position the races of the bearing to prevent misalignment thereof in assembling the device, which would otherwise result in the initial preloading of the bearings in the assembly, resulting in excessive wear due to friction.

The present invention also has as an object the idea of providing a novel type of thrust bearing accommodating varying misalignment of the shaft with a minimum of friction and which can be readily adjusted as desired to assure proper functioning of the thrust bearing assembly with a minimum of friction without preloading the bearing and without concentrating thrust loads upon a small number of anti-friction elements of the bearing device. This construction therefore contemplates adjustable means for the thrust receiving elements with a suitable mounting for said abutments permitting movement thereof in accordance with the adjustment of other elements of the thrust bearing assembly due to misalignment of the shaft.

The present invention also includes as an object the idea of providing means for retaining various adjusted elements of the thrust bearing assembly in any of their selected positions.

Other objects, features, capabilities and advantages are comprehended by the invention, as will later appear and as are inherently possessed thereby.

Referring to the drawing.

Figure 1:
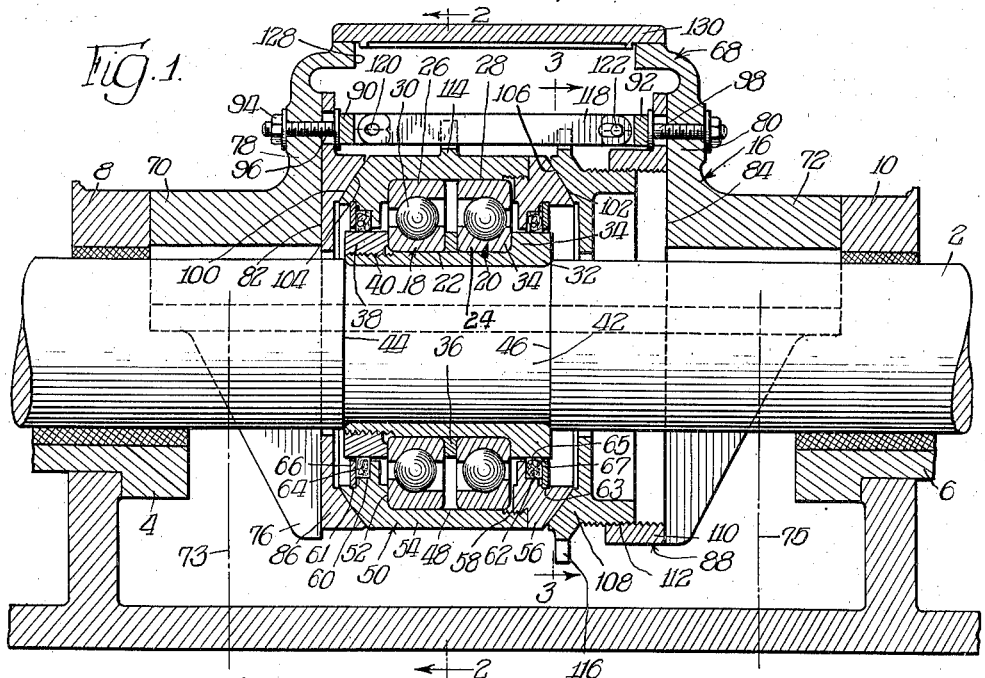
Figure 1 is a fragmentary view in vertical cross-section of a shaft mounting incorporating a thrust bearing assembly made in accordance with the present invention.
Figure 2:
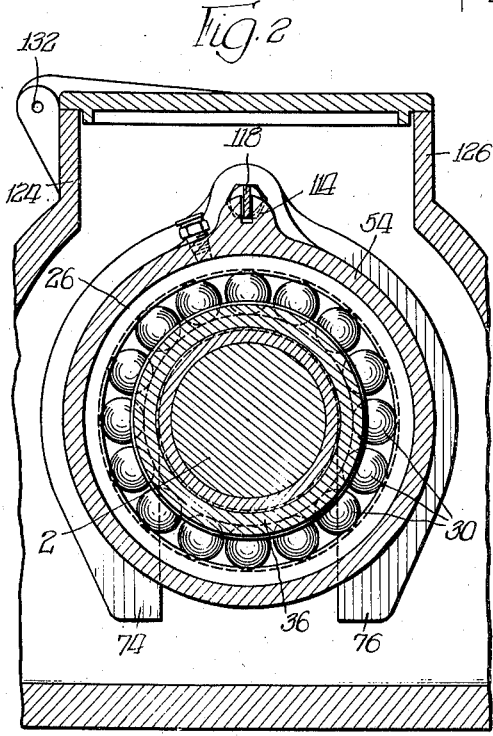
Figure 2 is a fragmentary view in cross-section taken in the plane represented by line 2—2 of Figure 1 of the drawing.
Figure 3:
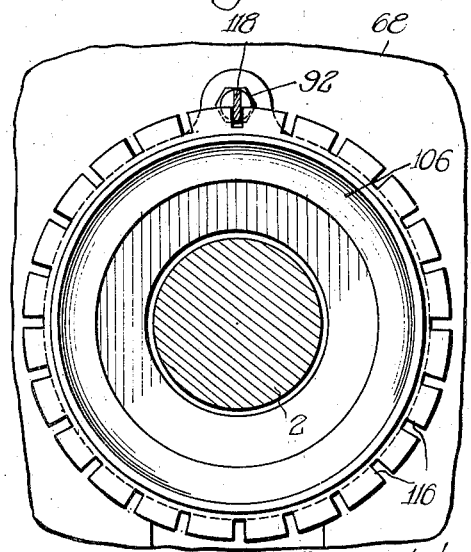
Figure 3 is a fragmentary view in cross-section taken in the plane represented by line 3—3 of Figure 1 of the drawing.

Referring now more in detail to the drawing, an embodiment selected to illustrate the present invention is disclosed in association with a shaft 2 which, adjacent one end, may be operatively connected to a source of power and at the other end connected to some instrumentality adapted to be driven by said source of power. The assembly is particularly adapted and is so constructed as to accommodate thrust in two directions in an assembly comprising an electric motor (not shown) coupled to the shaft 2 at one end, and a centrifugal dredging pump of single suction type (not disclosed) operatively connected thereto at its other end. Although the particular thrust bearing assembly herein disclosed has been particularly designed for an assembly as indicated, nevertheless its uses in association with shafts for transmittal of thrust are unlimited, and the invention therefore comprehends its general application to power drives and the like.

The shaft 2 is journaled at spaced points 4 and 6 in thrust supports 8 and 10, respectively, which thrust supports form a part of a frame 14 which may or may not be used for additionally supporting other elements of the assembly.

The two-directional thrust bearing assembly made in accordance with the present invention is generally referred to as 16 and comprises antifriction bearings 18 and 20 of high thrust capacity, these bearings, as shown, comprising inner racerings 22 and 24 and outer racerings 26 and 28, respectively, such racerings providing raceways for the reception of ball bearings 30, although, as will be clearly appreciated upon a further disclosure of the invention, any type of thrust bearings may be used in the assembly with equally efficient results as those obatined by the use of said bearing assemblies 18 and 20.

The bearing assemblies 18 and 20 are mounted upon a split sleeve 32, the racering 24 of bearing 20 abutting shoulder 34 thereof upon positioning of the bearings on said split sleeve.

Inasmuch as the invention contemplates the use of bearings, such as 18 and 20, which are constructed to commercial limits of accuracy only and are not specially ground so that the inner and outer racerings thereof exactly line up radially under load, it has been found desirable to provide a spacer ring, such as ring 36, therebetween. However, if bearings are used which have been manufactured accurately so as to be in exact radial alignment under load, the ring 36 may be dispensed with, if desired. The inner raceways are positioned by means of a nut 38 threaded as at 40 to the split ring 32. In order for the thrust of the shaft 2 to be transmitted to the thrust bearing 16, as will be hereinafter more fully described, the split sleeve 32 is fitted within a recess 42 providing shoulders 44 and 46 cooperating with the ends of split sleeve 32.

The anti-friction bearings 18 and 20 have their outer racerings 26 and 28 fitting within the bore 48 of housing 50. This housing is of multi-part construction comprising part 56 screw-threaded as at 58 into part 54, said part 54 being formed with an annular shoulder 52 disposed in abutting relation with the outer race 26 of roller bearing 18, and said part 56 forming an abutment disposed in opposed relation to the outer race 28 of roller bearing 20. Parts 54 and 56 are provided with annular recesses 60 and 62 adapted to receive felt washers or the like, 64 and 65, which cooperate with nut 38 and sleeve 32 to provide a lubricant seal, said washers being held in place by retaining rings 66 and 67 disposed within annular grooves 61 and 63 and abutting the said washers 64 and 65. It will therefore be clearly apparent that the thrust assembly comprising the inner sleeve assembly, bearing devices, and outer housing 50 is fixed to the shaft 2 for transmittal of thrust in either of two directions from the shaft to suitable thrust supports, and the housing 50, being provided with closures including the felt washers and retaining rings, provides a completely enclosed lubricant chamber assuring the proper lubrication of the roller bearing devices 18 and 20 without the ingress of water, dust or other foreign substances.

The thrust from housing 50 is transmitted to either one of the thrust supports 8 and 10 by means of a thrust cap 68 which may be in the form of a casting having saddles 70 and 72 in thrust bearing relation to the thrust supports 8 and 10 and held in position as by means of a plurality of bolts connected to frame 14, such as represented by the center lines 73 and 75. These saddles are in the form of horseshoe members embracing shaft 2 and are provided with depending thrust receiving parts, such as 74 and 76, the saddles 70 and 72 being formed integral with end walls 78 and 80, respectively, thus providing bearing surfaces 82 and 84 which may be machined for intimate bearing relation with thrust collars 86 and 88 embracing shaft 2 and being disposed between saddles 70 and 72 and the housing 50.

The thrust collars 86 and 88 are swingably and movably mounted with respect to the thrust cap by means of cap screws 90 and 92 which pass through aligned openings in said collars and walls 78 and 80 and are held in place as by means of the nuts 94, the openings 96 and 98 in the collars 86 and 88, respectively, being slotted as shown to provide for the movement as above indicated.

The collars 86 and 88 are formed with concave spherical surfaces 100 and 102, respectively, which surfaces are adapted to cooperate with similar convex surfaces 104 and 106 formed at the ends of housing 50, such surfaces permitting adjustment of the thrust bearing assembly with respect to thrust collars 86 and 88 upon any misalignment of the shaft 2.

In order to provide a structure which can be readily assembled and to properly position the housing 50 in respect to thrust collars 86 and 88 for uniform transmittal of thrust from the thrust bearing assembly to the thrust cap, the collar 88 is of multi-part construction comprising parts 108 and 110 threadedly secured together as at 112, part 110 being in bearing relation to bearing surface 84 and being provided with opening 98 for mounting with respect to saddle 72 and part 108 being formed with the spherical surface 102 for bearing relation with the spherical surfaces 106 of the housing 50. In assembling the present embodiment, one of the parts 108 or 110 is rotated with respect to the other to decrease the width thereof so as to be readily received between housing 50 and the bearing surface 84. After being so positioned, one of the parts may be rotated with respect to the other to expand the assembly until the spherical surfaces and the cooperating bearing surfaces of the collars and thrust cap are all in proper contact, after which part 108 is backed off slightly to allow proper working clearances and to allow for proper lubrication.

The adjustment above described is maintained by a locking bar 118 pivoted as at 120 in the head of set screw 90 and locked as by means of a locking bolt or cotter pin as at 122 to the head of set screw 92. This bar, when in locked position as shown in the drawing, is received in a slot provided in a lug projecting from housing 50 and in an aligned slot which is one of a number formed between a plurality of lugs 116 disposed in spaced relation about the periphery of part 108.

The thrust cap 68, hereinbefore described in part, may, as suggested, comprise a casting including the additional side walls 124 and 126 which, together with walls 78 and 80, form a box-like structure at its upper part adapted to receive elements of the thrust assembly as hereinbefore described and as shown in the drawing. This box-like structure is formed with an opening 128 normally closed by closure member 130 hinged as at 132, which serves to prevent ingress of dust, dirt, water, or other foreign substances into the assembly and when opened provides immediate access to the thrust assembly whereby adjustments may be readily made.

It will be apparent from a consideration of the above disclosure that a thrust bearing assembly has been provided which may be easily and readily assembled and disassembled and wherein means has been provided to properly lubricate the anti-friction bearings thereof. Furthermore, such assembly provides for uniform and equal distribution of thrust loads among all of the anti-friction elements of the bearing under varying misalignment of the shaft, these desiderata being accomplished through the cooperating curved surfaces of the housing and thrust caps, as clearly described, and the particular mounting for said thrust collars which permits adjustment of the thrust bearing under such conditions. It will be further noted that the arrangement and construction of the parts of the thrust bearing assembly are such that adjustment can be readily made to provide for the proper transmittal of thrust, and that the anti-friction bearings are so disposed and arranged with respect to the other elements of the assembly that end play in the shaft can be adjusted within extremely close limits, yet providing for proper rotation of the shaft with a minimum of friction. Furthermore, such adjustment as above alluded to provides for a proper disposition of the various operating parts of the assembly initially without pinching or otherwise preloading the anti-friction bearings in the assembly, which would cause undue and excessive friction, leading to deterioration because of wear within a short period after installation.

While we have herein described and upon the drawing shown an illustrative embodiment of the invention, it is to be understood that the invention is not limited thereto but comprehends other constructions, arrangements of parts, details and features without departing from the spirit of the invention.

We claim:

1. In combination, a shaft, a self-contained anti-friction thrust bearing assembly having a thrust relation with said shaft, said assembly comprising inner and outer housing members, an anti-friction bearing unit disposed within said members, means providing substantially fluid-tight joints between said members, a thrust abutment, a second thrust abutment associated with said first-named thrust abutment and movable with respect thereto in a plane transversely disposed with respect to said shaft and being provided with a curved thrust surface, said outer of said housing members having an exteriorly disposed curved thrust surface cooperating with said curved surface of said second-named thrust abutment, said surfaces and said movable relation between said abutments being provided to distribute thrust loads to said anti-friction bearing unit under varying misalignment of said shaft.

2. In combination, a shaft, a self-contained anti-friction thrust bearing assembly having thrust relation with said shaft, said assembly comprising inner and outer housing members, anti-friction bearing units disposed within said members, means providing substantially fluid-tight joints between said members, opposed fixed abutments having abutment surfaces in planes substantially normal to the axis of said shaft, thrust collars movably disposed between said bearing assembly and fixed abutments and having thrust surfaces cooperating with the said thrust surfaces of said fixed abutments, said collars also being provided with curved thrust surfaces, and the outer of said housing members having end exteriorly disposed curved thrust surfaces cooperating with said curved surfaces of said collars.

3. In combination, a shaft, a self-contained anti-friction thrust bearing assembly having thrust relation with said shaft, said assembly comprising inner and outer housing members, anti-friction bearing units disposed within said members, means providing substantially fluid-tight joints between said members, opposed fixed abutments having abutment surfaces in planes substantially normal to the axis of said shaft, thrust collars movably disposed between said bearing assembly and fixed abutments and having thrust surfaces cooperating with the said thrust surfaces of said fixed abutments, said collars also being provided with curved thrust surfaces, and the outer of said housing members having end exteriorly disposed curved thrust surfaces cooperating with said curved surfaces of said collars, and means for loosely mounting said collars with respect to said fixed abutments to permit relative movement of said collars with respect to said fixed abutment transversely of the axis of said shaft.

4. In combination, a shaft, a self-contained anti-friction thrust bearing assembly having thrust relation with said shaft, said assembly comprising inner and outer housing members, anti-friction bearing units disposed within said members, means providing substantially fluid-tight joints between said members, opposed fixed abutments having abutment surfaces in planes substantially normal to the axis of said shaft, thrust collars movably disposed between said bearing assembly and fixed abutments and having thrust surfaces cooperating with the said thrust surfaces of said fixed abutments, said collars also being provided with curved thrust surfaces, and the outer of said housing members having end exteriorly disposed curved thrust surfaces cooperating with said curved surfaces of said collars, at least one of said collars being of multi-part construction having means for adjusting its bearing relation with the adjacent fixed abutment and said bearing assembly, and means for loosely mounting said collars with respect to said fixed abutments to permit relative movement of said collars with respect to said fixed abutments transversely of the axis of said shaft.

5. In combination, a shaft, journal means for said shaft having opposed thrust supports, a self-contained anti-friction thrust bearing assembly disposed between said supports and having thrust relation with said shaft, said assembly comprising inner and outer housing members, anti-friction bearing units disposed within said members, means providing substantially fluid-tight joints between said members, a thrust cap in the form of a housing having end saddles embracing said shaft and being in thrust relation to said supports, said cap having opposed fixed abutments provided with abutment surfaces in planes substantially normal to the axis of said shaft, said fixed abutments being formed in part by said saddles, thrust collars movably disposed between said bearing assembly and fixed abutments and having thrust surfaces cooperating with the said thrust surfaces of said fixed abutments, said collars also being provided with curved thrust surfaces, and the outer of said housing members having end exteriorly disposed curved thrust surfaces cooperating with said curved surfaces of said collars, at least one of said collars being of multi-part construction having means for adjusting its bearing relation with the adjacent fixed abutment and said bearing assembly and means for loosely mounting said collars with respect to said fixed abutment to permit relative movement of said collars with respect to said abutment surfaces of said fixed abutments transversely of the axis of said shaft.

6. In combination, a shaft, a self-contained anti-friction thrust bearing assembly having thrust relation with said shaft, said assembly comprising inner and outer housing members, an anti-friction bearing unit disposed within said members, means providing substantially fluid-tight joints between said members, a thrust abutment provided with a curved thrust surface, and said outer of said housing members having an exteriorly disposed curved thrust surface cooperating with said curved surface of said thrust abutment to distribute thrust load to said anti-friction bearing unit under varying misalignment of said shaft.

DONALD A. PRICE.
GEORGE C. JANSER.
PERRY I. NAGLE.